(12) United States Patent
Tofano

(10) Patent No.: US 8,775,759 B2
(45) Date of Patent: Jul. 8, 2014

(54) FREQUENCY AND MIGRATION BASED RE-PARSING

(76) Inventor: Jeffrey Tofano, San Jose, CA (US)

( * ) Notice: Subject to any disclaimer, the term of this patent is extended or adjusted under 35 U.S.C. 154(b) by 238 days.

(21) Appl. No.: 13/373,981

(22) Filed: Dec. 7, 2011

(65) Prior Publication Data

US 2013/0151803 A1 Jun. 13, 2013

(51) Int. Cl.
*G06F 12/00* (2006.01)
(52) U.S. Cl.
USPC ........................................... 711/165
(58) Field of Classification Search
None
See application file for complete search history.

(56) References Cited

U.S. PATENT DOCUMENTS

| | | | |
|---|---|---|---|
| 2009/0222454 A1* | 9/2009 | Liesche et al. | 707/10 |
| 2012/0151169 A1* | 6/2012 | Mori et al. | 711/166 |
| 2012/0278569 A1* | 11/2012 | Kawakami et al. | 711/162 |

OTHER PUBLICATIONS

Meister et al., "dedupv1: Improvign Deduplication Throughput using Solid State Drives", © 2010 IEEE, p. 1-6.*
Berman et al., "Integrating De-duplicaiton and Write for Increased Performance and Endurance of Solid-State Drives", © 2010 IEEE, p. 821-823.*

* cited by examiner

*Primary Examiner* — Brian Peugh

(57) ABSTRACT

Example apparatus and methods associated with frequency and migration based re-parsing are provided. One example data de-duplication apparatus includes a migration logic and a parsing logic. The migration logic may be configured to perform a data transfer according to an access frequency to the data. The parsing logic may be configured to re-parse the data based on the access frequency to the data. In different examples, parsing the data may be performed in response to migrating the data. In one example, parsing the data may be performed during or after the migration. Additional examples illustrate parsing the data to balance performance against reduction in light of access frequency to the data block.

15 Claims, 4 Drawing Sheets

FREQUENCY AND MIGRATION BASED RE-PARSING

BACKGROUND

Data that requires frequent access is often stored in high performance primary storage to facilitate quick access times. By contrast, infrequently accessed data is often stored in slower secondary storage. While it may be desirable to have all data quickly accessible, primary storage is costly. Conversely, while secondary storage is more cost efficient, high access times mean that it is not ideal for all applications. Additionally, in either case, it is desirable to improve use of storage space to promote cost savings. Thus, tradeoffs between performance and reducing data volume are balanced to attain efficient data storage.

One approach to addressing the performance versus reduction tradeoff uses data de-duplication to reduce data storage volume. Data de-duplication involves eliminating redundant data to optimize allocation of storage space. De-duplication may involve dividing a larger piece of data into smaller pieces of data. De-duplication may be referred to as "dedupe". Larger pieces of data may be referred to as "blocks" while the smaller pieces of data may be referred to as "sub-blocks" or "chunks". Dividing blocks into sub-blocks may be referred to as "chunking" or parsing.

There are different approaches to parsing. In one approach, a rolling hash may identify sub-block boundaries in variable lengths. In another approach, instead of identifying boundaries for variable sized chunks using a rolling hash, parsing may be performed by simply taking fixed size sub-blocks. In a hybrid approach, a combination of rolling hash variable length chunks may work together with fixed sized chunks.

Different parsing approaches may take different amounts of time to sub-divide a block into sub-blocks. Additionally, different parsing approaches may lead to more or less data reduction through dedupe. Therefore, parsing schemes have been characterized by performance (e.g., time), and reduction (e.g., percent).

By way of illustration, some parsing can be performed quickly but leads to less reduction while other parsing takes more time but leads to more reduction. For example, a variable sized parsing approach that considers multiple possible boundaries per chunk may take more time to perform but may yield substantially more reduction. In contrast, a fixed size parsing approach that considers only a single fixed size sub-block may take less time to perform but may yield minimal, if any, reduction. Thus, there may be a tradeoff between performance time and data reduction.

Conventionally, different parsing, hashing, and/or sampling approaches may balance the tradeoff between performance and reduction in different ways. Aware of the different performance times and resulting data reductions, some dedupe schemes may first analyze the type of data to be deduped before deciding on an approach. Other predictive schemes may determine an approach based on the entropy of data to be processed. The different approaches may be based on a prediction of the resulting data reduction possible in a given period of time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
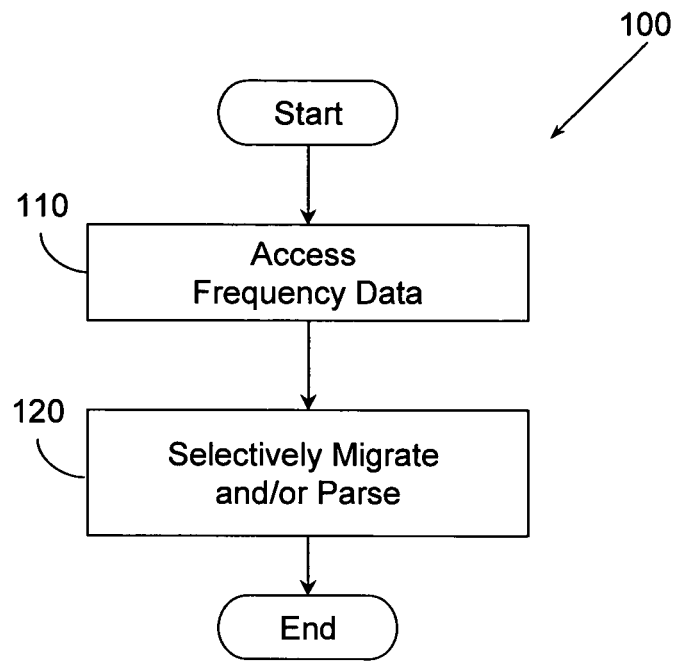
FIG. 1 illustrates a method associated with frequency and migration based reparsing.

Example apparatus and methods described herein present an approach for addressing performance tradeoffs when using different types of storage and different types of parsing. Example approaches use access frequency data associated with a data block to improve data storage and parsing. For example, improvement may be achieved by actively migrating data between different storage locations and/or applying different parsing techniques to achieve an improved balance between performance and data reduction.

Example apparatus and methods selectively perform frequency based reparsing and/or migration. Example apparatus and methods may also perform migration triggered reparsing. Example frequency based approaches may track and/or access frequency data associated with different data blocks. This frequency data may include information describing how often a data block is accessed, who accesses the data block, a location from which the data block is accessed, and so on.

As access frequencies for a data block change, migrating the data block to a different storage location may improve efficiency. For example, a data block that is frequently accessed and is located in a high performance (e.g. low latency) primary storage location may; over time, receive fewer accesses. The data block is consuming a high cost memory location yet no longer requires the performance advantage of low-latency storage. Accordingly, exemplary methods and apparatus may migrate the data block to a lower performance secondary memory as the access frequency to the data block decreases. In this way, example methods and apparatus may use the frequency data to determine when and/or where to migrate the data block.

As access frequencies change, selections for parsing, migrating, and other de-duplication decisions can be changed to yield a desired balance between performance times and reductions. It may be desirable to balance the tradeoff between performance and reduction in different ways under different conditions. For example, when data is being parsed in-line during a migration, performance may trump reduction. However, when data is being parsed for deep storage, reduction may trump performance. Additionally, when data is being stored in low-latency memory, performance may also trump reduction. Thus, different parsing algorithms may be selected and applied according to different conditions.

Example apparatus and methods facilitate identifying parsing and/or migrating approaches that achieve desired results for different conditions (e.g., inline parsing, deep storage, frequently accessed). As frequency data is acquired, example systems and methods may apply different parsing algorithms and/or migrate data to different locations in order to better balance performance versus reduction in data.

In one approach, parsing and/or reparsing is triggered by a migration of the data. For example, while in a first storage location the focus may be on performance due to a high access frequency, and thus a performance oriented parsing algorithm is applied to the data. However, as the access frequency slows and the data is migrated to a cold storage, performance is no longer a main concern and a parsing algorithm that maximizes reduction in data may be applied. Data in a cold storage is infrequently accessed and therefore is not as sensitive to performance concerns associated with more intensive parsing approaches. Thus, applying an algorithm to achieve greater reduction in data volume is not hindered by performance requirements.

A dedupe environment may include many actors and entities that influence data storage performance and efficiency. For example, an enterprise wide dedupe environment may include participants that work on data from different locations. The enterprise wide dedupe environment may also include different machines that have different processing power and different communication capacity. The combination of various data locations, processing power, communication power, backup requirements, and so on, may produce different storage requirements at different locations. Therefore, it may be desirable to balance the performance/reduction tradeoff one way in one location and another way in another location.

As a result of this preferred balancing in one location as compared to another location, data in various locations may be parsed differently. Thus, when migrating data to a common archiving location from disparate locations it may be useful to reconcile data blocks to use a common parsing algorithm. Promoting uniformity in this way facilitates improved performance and is one example of how parsing is triggered by migrating data.

Another consideration in parsing data may be when to parse the data. For example, parsing data that is frequently accessed introduces factors that may negatively impact performance. For example, data being (re)parsed may not be available for use. Thus, one way of avoiding these negative effects is to parse the data in-line while being migrated to a high performance storage location instead of after the migrating. By contrast, data that is migrating out of primary hot storage to a secondary cold storage may be parsed once in cold storage where performance is not as important.

Since dedupe may be performed for different actors (e.g., people, applications, groups) and for different entities (e.g., data streams, computers), in one example, apparatus and methods are configured to track access data at the actor level and/or at the entity level. For example, one office location in an enterprise may consistently be a frequent accessor of a certain piece of data. While other distributed locations may also access the same piece of data, a majority of bandwidth consumed due to accessing this data is attributable to the one location. Thus, in one example, apparatus and methods may track access frequency associated with a location and migrate the data to that location when a significant portion of the accesses are attributable to the location. In this way, bandwidth usage associated with access to the data may be reduced. In one embodiment, the data may be duplicated to the location rather than completely transferring the data. This approach facilitates reducing bandwidth consumption while still maintaining the data at a central repository for efficient access by other entities.

In one example, apparatus and methods may be configured to associate frequency data with blocks, sub-blocks, data streams, files, and so on. In one example, the information may be added to the block, sub-block, or so on. In another example, information about access frequency may be added to an existing dedupe data structure (e.g., index). In yet another example, access frequency data may be stored in a separate dedupe data structure. One skilled in the art will appreciate that there are different ways to associate information with data to be parsed/migrated and/or with data that has been parsed/migrated.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with frequency and migration based reparsing in a data de-duplication system. Method 100 includes, at 110, accessing frequency data for a data block in a de-duplication system. The frequency data may include, but is not limited to, an access frequency to the data block, a reference count, an entity that accesses the data block, a location for an entity that accesses the data block, and a required level of performance associated with the data block.

In one embodiment, the frequency data is stored with the data block. In other embodiments, the frequency data may be stored in locations including, but not limited to, a dedupe data structure associated with the data block, and a dedupe data repository. In one example, the frequency data may be part of a de-duplication experience data. The de-duplication experience data may include, but is not limited to including, performance time data, frequency data, and data reduction data. Performance time data may describe how long it takes to perform data reduction. Data reduction data may describe a data reduction factor. For example, if a data set occupies 1 Mb of storage before de-duplication but consumes 500 Kb of storage after de-duplication, then the data reduction factor would be 50%. The frequency data may be acquired on a per actor basis, a per entity basis, or a combination thereof and the frequency data may be acquired on a local basis, a distributed basis, or a combination thereof.

Method 100 may also include, at 120, selectively migrating the data block and/or parsing the data block. Migrating and parsing the data block may selectively occur as a function of the frequency data. In one embodiment, the data block may be migrated from a first storage location to a second storage location without being parsed. In another embodiment, the data may be parsed according to an algorithm selected based on the frequency data without being migrated. In further embodiments, the data may be migrated between storage locations and parsed.

In one example, selectively migrating at 120 includes transferring the data block from a first storage location to a second storage location. Migrating the data block at 120 occurs, for example, when the access frequency to the data block reaches a threshold limit for the first data storage location. The threshold limit may be defined for either/both of a reduction and/or increase in access frequency.

In one embodiment, method 100 includes parsing in response to migrating, as a result of the frequency data changing, and/or as a matter of maintenance on the data.

While FIG. 1 illustrates various actions occurring in serial, it is to be appreciated that various actions illustrated in FIG. 1 could occur substantially in parallel. By way of illustration, a first process could access frequency data, a second process could selectively migrate the data block, and a third process could selectively parse the data block. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a non-transitory computer-readable medium may store computer executable instructions that if executed by a machine (e.g., processor) cause the machine to perform a method that includes accessing frequency data, selectively migrating/parsing, and so on.

While executable instructions associated with the above method are described as being stored on a computer-readable medium, it is to be appreciated that executable instructions associated with other example methods described herein may also be stored on a computer-readable medium.

Figure 2:
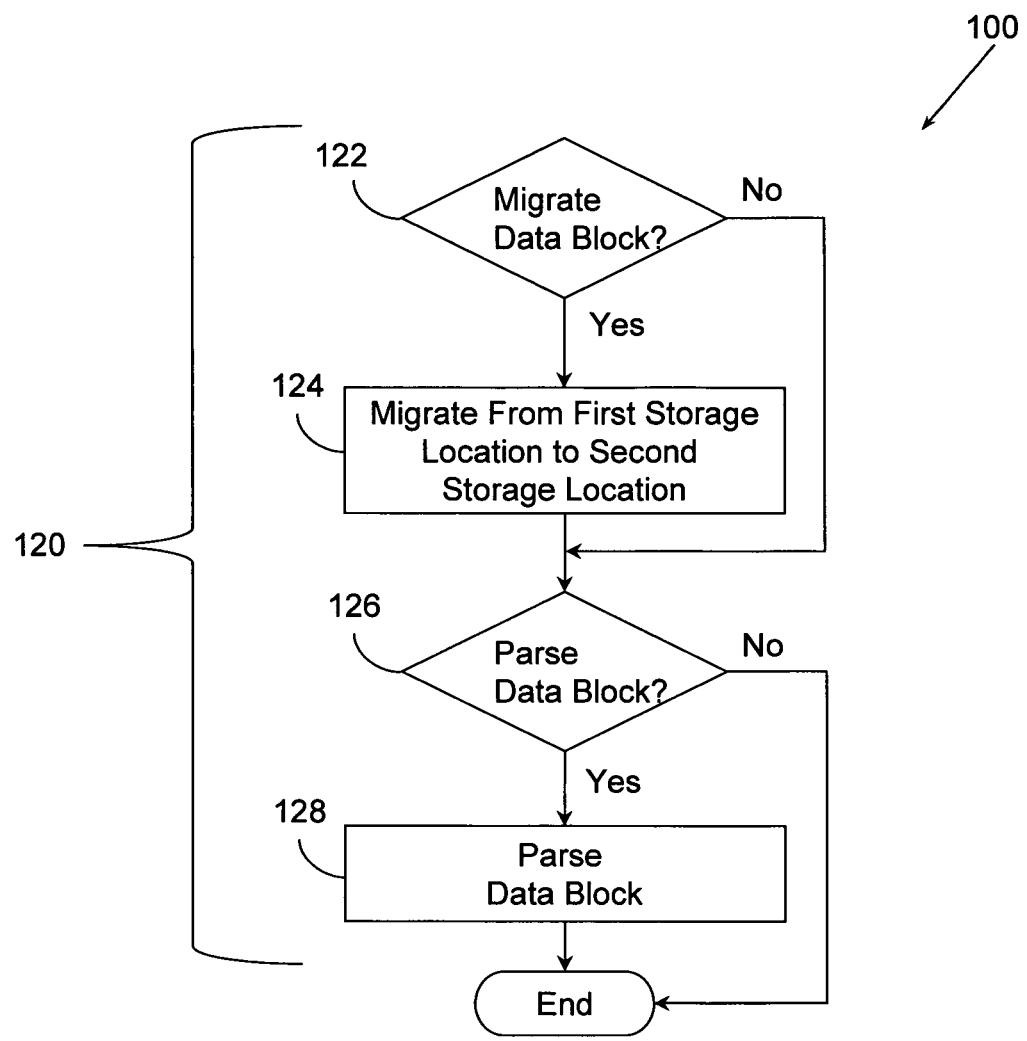
FIG. 2 illustrates additional detail for a method associated with frequency and migration based reparsing.

FIG. 2 illustrates additional detail for one embodiment of method 100. In this embodiment, selectively performing the migrating and/or parsing at 120 can include several actions. The actions can include, but are not limited to, determining whether to migrate the data block at 122, migrating the data block at 124, determining whether to parse the data block at 126, and parsing the data block at 128.

In one embodiment, at 122, the method 100 determines whether the access frequency to the data block has fallen below a predetermined threshold. When the access frequency falls below the predetermined threshold the data block is migrated to a second storage location. The second storage location may provide access to the data block with improved efficiency and/or lower cost for the reduced frequency.

In this example, the first storage location may be a hot storage. A hot storage may be, for example, a high performance primary memory or other similar frequently accessed storage that provides low latency access times. In a different example, the hot storage may be a data store that is designated with a higher priority than another data store. When a current storage location for the data block is a hot storage the predetermined threshold is set to a minimum access frequency to maintain the data block in the storage location. In this way, when data in the storage location becomes stale from less frequent activity the system may transfer the data to a slower secondary memory.

In a different embodiment, at 122, the method 100 determines whether the access frequency exceeds a predetermined threshold for the first storage location. When the access frequency exceeds the predetermined threshold the data block may be migrated to a second storage location. The second storage location may provide access to the data block with improved efficiency for the increase in access frequency.

In this example, the first storage location may be a cold storage. A cold storage may be, for example, a low performance secondary memory or other similar less frequently accessed storage that has higher latency access times and/or is designated as a lower priority data store. For example, cold storage may be a storage location that is one or more levels of priority below a primary storage. A system may use cold storage as general data storage, backup storage, application storage, and so on. Accordingly, when a current storage location for the data block is a cold storage the predetermined threshold is set to a maximum access frequency to maintain the data block in the storage location. This improves efficient data storage by improving data distribution between appropriate types of storage and/or techniques used to store the data. Thus, when the access frequency to a data block in cold storage increases, efficiency may be improved by migrating and/or parsing the data block.

In another embodiment, at 122, method 100 determines whether the frequency data indicates that a remote entity is a source of frequent access to the data block. In this example, migrating the data block to a storage location that may be at a facility proximate to the remote entity facilitates reducing bandwidth consumption. Migrating data in this manner reduces redundant network communications, therefore, reducing network bandwidth consumption and increasing network efficiency. This is one example of how de-duplication may reduce data redundancy in network communications.

At 124, the method 100 migrates the data from the first storage location to the second storage location based on a positive determination at 122. The migrating may include transferring the data block from the first location to the second location over, for example, a network, a direct data link, and so on. In another example, the migrating includes copying the data from the first storage location to the second storage location. Copying the data block to the second storage location may improve access efficiency by reducing network bandwidth consumption. Thus, duplicating the data block to the remote source and leaving a copy at the first storage location may improve access efficiency by reducing bandwidth consumption associated with the remote source. Leaving a copy of the data block at the first storage location for other entities to access while appearing to create redundant data can actually reduce communication redundancies by decreasing network traffic.

At 126, method 100 determines whether to parse the data block as a function of the frequency data. In one example, the parsing is a reparsing of the data block since the data block was parsed in a prior de-duplication. In another example, the parsing may be the first time the data is being parsed. Additionally, parsing the data block as a function of the frequency data may include, for example, selecting an algorithm to use for the parsing, determining when to parse the data block to improve performance, and so on. In one example, migrating the data block to a second storage location may yield sufficient improvements that the parsing may not occur.

In one embodiment, the data block is parsed in response to the migrating. For example, when the method 100 performs the migrating it may be useful to also parse the data block. Parsing the data block in response to the migrating may occur in order to improve the data block for the second storage location. When parsing in response to migrating the data block the parsing may be performed in-line during the migrating or after the migrating is complete when the data block is resident in the second storage location.

Parsing the data block in-line may occur, for example, to improve performance. Thus, in-line parsing may be performed, for example, when the second storage location is a hot storage that is performance oriented. In this way, the parsing is not accessing the data stored in the second storage location and interfering with performance of the second storage location.

In another example, the data block is parsed once migration is complete. Parsing the data block after migrating may be performed, for example, when the second location is a cold storage. When the data block is stored in a cold storage it is feasible to dedicate more resources to parsing the data and thus the parsing may occur after the migrating is complete. In another embodiment, determining whether to parse the data may be based on, for example, a change in the frequency data, and so on.

At 128, parsing the data block may include selecting a parsing algorithm and applying the algorithm. Selecting a parsing algorithm may be based on one or more factors. For example, when selecting a parsing algorithm the method 100 may consider frequency data, a type of storage (e.g. hot or cold), whether the parsing is occurring in-line, and so on. Method 100 may include selecting and applying a parsing algorithm to increase performance when the frequency data indicates a high access frequency. Method 100 may include selecting and applying a parsing algorithm to increase reduction in data when the frequency data indicates a low access frequency.

In another embodiment, at 128, method 100 may include selecting and applying a parsing algorithm based, at least in part, on an algorithm used to parse other data blocks in a storage location. This may occur to facilitate reconciling an algorithm used to parse the data block with a second algorithm used to parse other data blocks in the storage location. Performance may be improved by using a single parsing algorithm to parse all data blocks in a storage location. This uniformity in the data promotes efficiency when accessing data stored in the storage location.

In additional embodiments, selecting and applying a parsing algorithm is based, at least in part, on a type of storage (e.g. low or high priority) for the second storage location. For example, a parsing algorithm to increase reduction in data may be applied when the second storage location is a cold storage, a parsing algorithm to increase performance may be applied when the second storage location is a hot storage, and so on.

Figure 3:
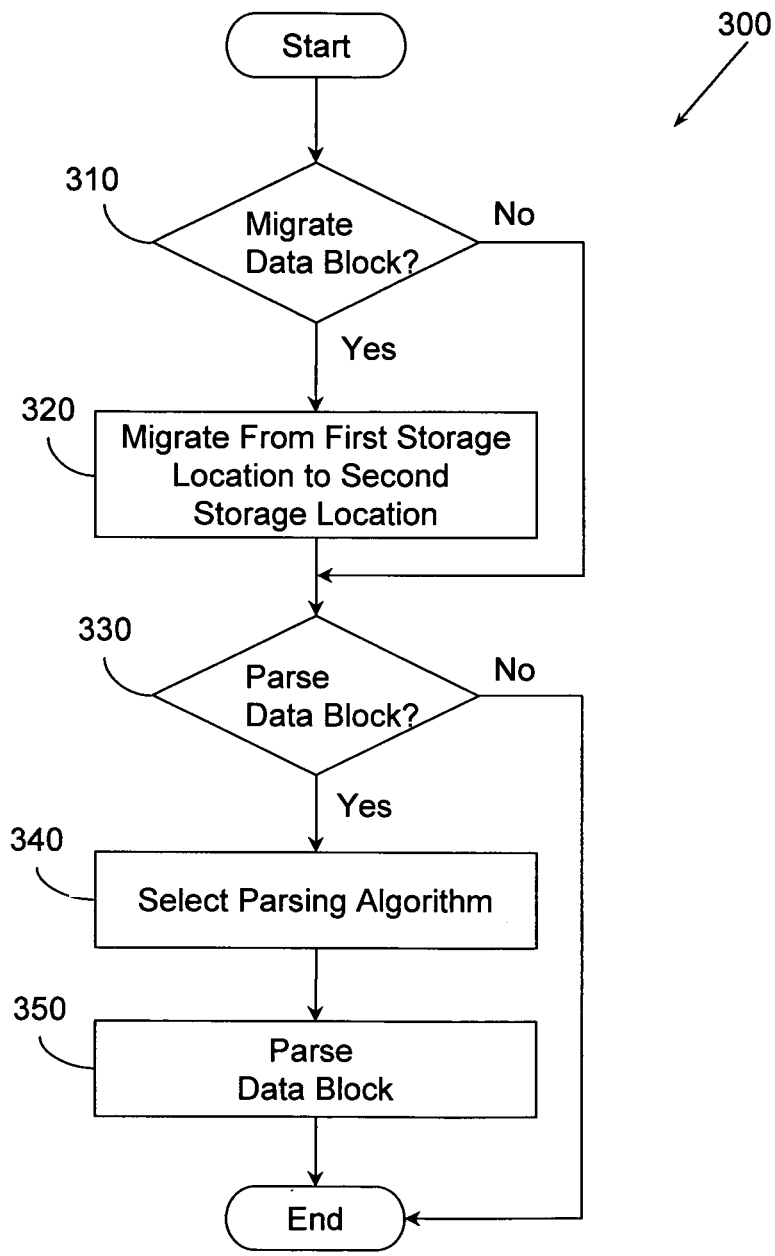
FIG. 3 illustrates an additional method associated with frequency and migration based reparsing.

FIG. 3 illustrates an additional method 300 associated with frequency and migration based reparsing. Method 300 includes, at 310, determining whether to migrate a data block to a different storage location. Determining whether to migrate the data block may be based on whether an access frequency has attained a limit for a current storage location.

In one embodiment, attaining a limit for a current storage location may include, but is not limited to, an access frequency or a reference count for a data block falling below a lower limit for maintaining the data block in a current storage location, and an access frequency or a reference count for a data block increasing above an upper limit for maintaining a data block in a current storage location.

Method 300 further includes, at 320, migrating the data block in response to a positive determination at 310. Migrating the data block may include, but is not limited to, transferring the data block over a network, or sending a data block across a direct data link.

At 330, method 300 includes determining whether to parse the data block. This determination may be based on the access frequency to the data block, a reference count for a number of references to the data block, the migrating, a type for a second storage location (e.g. hot or cold) where the data block is located or is being migrated, an algorithm used to parse other data blocks in a storage location, and so on.

If the determination at 330 is positive, the method 300 proceeds to 340 where a parsing algorithm is selected. In one embodiment, selecting a parsing algorithm may include selecting a parsing algorithm to increase reduction when the second data storage location is a cold storage and/or the access frequency is low, selecting a parsing algorithm to increase performance when the second data storage location is a hot storage and/or the access frequency is high, and so on.

Method 300 also includes, at 350, parsing the data block by applying an algorithm selected at 340. Parsing the data block, at 350, may include, but is not limited to, parsing the data block while the data is being transferred to a second storage location, parsing the data block after it is resident in the second storage location, and parsing the data block when it is resident in a current storage location.

Figure 4:
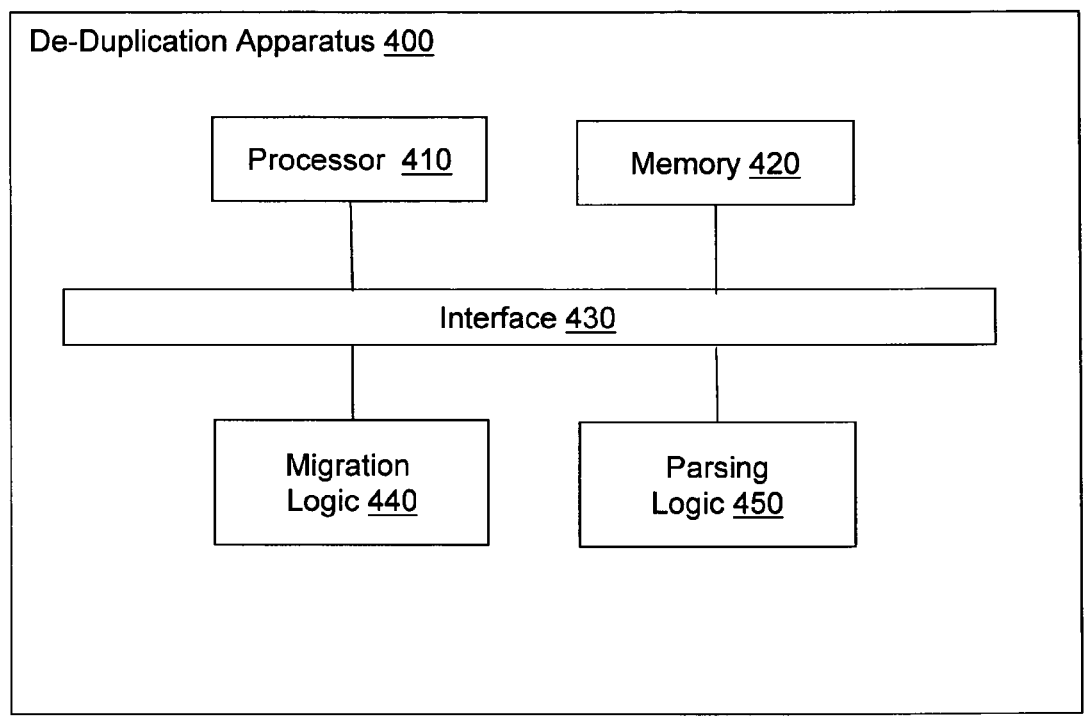
FIG. 4 illustrates an apparatus associated with frequency and migration based reparsing.

FIG. 4 illustrates a de-duplication apparatus 400 associated with frequency and migration based reparsing. De-duplication apparatus 400 includes a processor 410, a memory 420, an interface 430, a migration logic 440, and a parsing logic 450. Interface 430 is configured to connect the processor 410, the memory 420, and the logics 440 and 450.

In one embodiment, migration logic 440 is configured to transfer a data block from a first data store to a second data store. Migration logic 440 may be configured to selectively transfer the data block based, at least in part, on an access frequency to the data block. For example, when an access frequency to the data block increases past a predetermined level, the data block may be transferred to a primary data store with a lower latency time for accessing the data block. Alternatively, when the access frequency to the data block decreases past a predetermined level the data block may be transferred to a secondary data store with a higher latency time for accessing the data block but that is a lower cost memory.

In another embodiment, migration logic 440 is configured to transfer the data block to a data store selected from a plurality of data stores. The migration logic 440 may be configured to select a data store as a function of the access frequency. This may include, for example, determining a data store for efficiently storing and providing access to the data block at a current access frequency.

For example, the plurality of data stores may include a range of data stores with different configurations and attributes. In one example, data store A provides low latency access, data store B provides mid-range latency, data store C provides a high latency, and data store D provides the highest latency access. Data store A may be a high performance cache memory or a random access memory (RAM). Data store B may be a higher latency RAM, or a flash memory. Data store C may be a hard disk drive storage or an optical storage. Data store D may be an off-line backup storage or data archive.

For illustrative purposes, consider a data block currently in data store A. Data store A is a high cost memory and when an access frequency associated with the data block falls below a threshold it becomes inefficient to maintain the data block in data store A. Thus, migrating the data block to data store B may be an efficient choice. However, if the access frequency falls below the first threshold and below a second threshold while in data store A the migration logic 440 may transfer the data block to data store C instead. In this example, the access frequency is not high enough to justify maintaining the data block in data store A or data store B, thus the migration logic 440 improves efficiency by skipping data store B and transferring the data block directly to data store C. By transferring the data block to data store C space in data store B may be used for other data blocks that require the higher performance storage and an additional read and write cycle is avoided.

In one embodiment, parsing logic 450 is configured to re-parse the data block based on, for example, the access frequency to the data block, a reference count for the data block, and so on. Re-parsing the data block may include parsing a data block that was parsed in a previous de-duplication process. The parsing logic 450 may reparse the data block to improve a balance of the performance versus reduction tradeoff for a storage space. In another embodiment, the parsing logic 450 is configurable to parse a data block for the first time.

The parsing logic 450 may be further configured to reparse the data block when the data block is being transferred or after the data block has been transferred. Parsing logic 450 is configured to determine when to reparse a data block based on, for example, a type of the second storage and/or the access frequency to the data block. For example, when the second storage is a cold storage the parsing logic 450 may wait until the data block is completely transferred and then parse the data block using an algorithm that increases reduction. Alternatively, when the second storage is a hot storage the parsing logic 450 may parse the data during the transfer using a parsing algorithm to increase performance.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
  accessing frequency data for a data block in a de-duplication system, where the frequency data indicates at least an access frequency to the data block; and
  selectively performing, as a function of the frequency data, one or more of, migrating the data block from a first storage location to a second storage location, and parsing the data block,
  where the data block was previously de-duplicated and the parsing is a re-parsing of the data block, or where parsing the data block includes selecting a parsing algorithm and applying the selected parsing algorithm to the data block based, at least in part, on the frequency data.

2. The method of claim 1, where migrating the data block is performed when the access frequency falls below a predetermined threshold.

3. The method of claim 2, where the first storage location is a hot storage, and the predetermined threshold is a minimum access frequency to maintain the data block in the first storage location.

4. The method of claim 1, where migrating the data block is performed when the access frequency exceeds a predetermined threshold for the first storage location.

5. The method of claim 4, where the first storage location is a cold storage and the predetermined threshold is a maximum access frequency to maintain the data block in the first storage location.

6. The method of claim 1, where parsing the data block includes one of, parsing the data block while the data block is being migrated from the first storage location to the second storage location, and parsing the data block after the data block has been migrated to the second storage location.

7. The method of claim 6, where the parsing algorithm is selected, at least in part, to reconcile the parsing algorithm with a second algorithm used to parse data blocks associated with the second storage location.

8. The method of claim 6, where the parsing algorithm is selected based, at least in part, on a type of the second storage location.

9. The method of claim 8, where parsing the data block includes using a parsing algorithm to improve reduction in data when the second storage location is a cold storage and using a parsing algorithm to enhance performance when the second storage location is a hot storage.

10. The method of claim 1, where the parsing algorithm is configured to enhance performance when the frequency data indicates a high access frequency and the parsing algorithm is configured to enhance reduction in data when the frequency data indicates a low access frequency.

11. A non-transitory computer-readable medium storing computer executable instructions that when executed by a computer cause the computer to perform a method, the method comprising:

accessing frequency data for a data block in a de-duplication system, where the frequency data indicates at least an access frequency to the data block; and selectively performing, as a function of the frequency data, one or more of, migrating the data block from a first storage location to a second storage location, and parsing the data block, where migrating the data block is performed in response to determining that the frequency data indicates a frequent source of access to the data block is from a remote source associated with the second storage location, and where migrating the data block includes copying the data block to the second storage location at the remote source, and where the frequent source of access is a remote peer group associated with the remote source that accesses the data block more frequently than another peer group.

12. A non-transitory computer-readable medium storing computer executable instructions that when executed by a computer cause the computer to perform a method, the method comprising:

parsing a data block based, at least in part, on an access frequency to the data block, where parsing the data block based, at least in part, on the access frequency includes selecting one of, a parsing algorithm to enhance reduction when the second data storage location is a cold storage, and a parsing algorithm to enhance performance when the second data storage location is a hot storage, where the hot storage stores data that is frequently accessed and the cold storage stores data that is infrequently accessed.

13. The non-transitory computer-readable medium of claim 12, where the parsing is triggered by a migrating.

14. A data de-duplication apparatus, comprising:
a processor;
a memory;
a set of logics; and
an interface configured to connect the processor, the memory, and the set of logics, the set of logics comprising:
a migration logic configured to transfer a data block from a first data store to a second data store based, at least in part, on an access frequency to the data block, and where the migration logic is configured to select the second data store as a function of the access frequency, and where the second data store is selected from a plurality of data stores with different latency attributes; and
a parsing logic configured to re-parse the data block based, at least in part, on the access frequency to the data block.

15. The data de-duplication apparatus of claim 14, where the parsing logic is further configured to reparse the data block when the data block is being transferred or after the data block has been transferred based, at least in part, on one or more of, a property of the second data store, and the access frequency.

* * * * *

UNITED STATES PATENT AND TRADEMARK OFFICE
CERTIFICATE OF CORRECTION

| | | |
|---|---|---|
| PATENT NO. | : 8,775,759 B2 | Page 1 of 1 |
| APPLICATION NO. | : 13/373981 | |
| DATED | : July 8, 2014 | |
| INVENTOR(S) | : Jeffrey Tofano | |

It is certified that error appears in the above-identified patent and that said Letters Patent is hereby corrected as shown below:

In the Specification

In the Detailed Description:

In Column 2, line 41, delete "may; over" and insert --may, over--.

Signed and Sealed this
Seventh Day of October, 2014

Michelle K. Lee
*Deputy Director of the United States Patent and Trademark Office*